United States Patent
Warburton-Pitt

(10) Patent No.: US 7,066,441 B2
(45) Date of Patent: Jun. 27, 2006

(54) FLOW RESTRICTOR

(75) Inventor: Stephen Warburton-Pitt, Andover, NJ (US)

(73) Assignee: Saint-Gobain Performance Plastics Corporation, Wayne, NJ (US)

( * ) Notice: Subject to any disclaimer, the term of this patent is extended or adjusted under 35 U.S.C. 154(b) by 105 days.

(21) Appl. No.: 10/388,678

(22) Filed: Mar. 14, 2003

(65) Prior Publication Data

US 2006/0071188 A1 Apr. 6, 2006

(51) Int. Cl.
*F16K 7/06* (2006.01)

(52) U.S. Cl. ............................ 251/8; 137/553; 251/90
(58) Field of Classification Search ............... 251/8, 251/4, 90; 137/553
See application file for complete search history.

(56) References Cited

U.S. PATENT DOCUMENTS

| | | | | | |
|---|---|---|---|---|---|
| 2,838,949 | A | * | 6/1958 | Grigsby | 251/8 |
| 2,994,337 | A | * | 8/1961 | Freeman | 251/8 |
| 3,042,067 | A | * | 7/1962 | Hidding | 251/8 |
| 3,332,439 | A | * | 7/1967 | Burke | 251/8 |
| 3,948,477 | A | | 4/1976 | Lample | 251/8 |
| 4,257,446 | A | | 3/1981 | Ray | 137/368 |
| 4,569,502 | A | | 2/1986 | Elliott | 251/8 |
| 4,575,041 | A | | 3/1986 | Hu | 251/8 |
| 4,978,100 | A | | 12/1990 | Peurifoy | 251/8 |
| 5,197,708 | A | | 3/1993 | Campau | 251/8 |
| 6,082,702 | A | | 7/2000 | Campau | 251/8 |

* cited by examiner

*Primary Examiner*—John Bastianelli

(57) ABSTRACT

A device for controllably restricting flow through a resilient tube including a block and a pair of generally J-shaped leg members pivotally mounted to the block. The leg members, when pivoted together, together provide a tube support surface. The block is formed with a bore in which there is a rotatable internally threaded sleeve. A jaw member having a threaded shaft is threadedly mated to the sleeve and a knob is fixedly secured to the sleeve for rotation therewith. Accordingly, rotation of the knob moves the jaw member toward and away from the tube support surface to provide desired compression to a length of resilient tubing captured between the jaw and the tube support surface. By pivoting the leg members away from each other, space is provided for installation of the flow restriction device at any desired point along the length of the tubing.

6 Claims, 3 Drawing Sheets ly to the sleeve 18 outside the block 12, as by keyways 26 and elongated projections 28, or alternatively by being press fit thereon.

FLOW RESTRICTOR

BACKGROUND OF THE INVENTION

This invention relates to a flow restrictor and, more particularly, to such a device for use with resilient tubing, wherein the device can be placed at any location along the length of the tubing without requiring that the tubing have a free end.

There are numerous applications where it would be desirable to controllably restrict the flow through a length of resilient tubing. It would also be desirable to be able to install a flow restriction device on a length of tubing at any location along its length without requiring that the tubing have a free end over which the flow restriction device is installed.

SUMMARY OF THE INVENTION

According to the present invention, there is provided a device for controllably restricting flow through a resilient tube. The device comprises a block having a bore therethrough along a first axis and an internally threaded sleeve rotatable within the bore about the first axis. A knob outside the block is fixedly secured to the sleeve for rotation therewith. A pair of leg members are provided. The pair of leg members are mounted to opposite sides of the block for pivoting movement about a second axis orthogonal to the first axis. The pair of leg members, when pivoted toward each other, together form a tube support surface. A jaw member has a head with a surface on a first side shaped substantially complemental to the tube support surface formed by the pair of leg members. The jaw member also has a threaded shaft extending from a second side opposite the first side and which is threadedly mated with the sleeve.

In accordance with an aspect of this invention, each of the leg members is generally J-shaped with a straight portion terminated by a curved portion. The leg members are mounted to the block at the ends of their respective straight portions, and the tube support surface is formed from the curved portions of the leg members.

In accordance with another aspect of this invention, the block includes a projection having an aperture and the knob includes at least one projection having an aperture alignable with the block projection aperture. Accordingly, when the block projection and knob projection apertures are aligned, a cable tie can be inserted through both apertures to function as a lock and a tamper indicator.

In accordance with a further aspect of this invention, the jaw member includes a pair of opposed projections each moving along a respective side of a respective leg member straight portion as the jaw member moves along the first axis. The respective sides of the leg member straight portions are each provided with indicia. Accordingly, the jaw member projections function as pointers so that the jaw member can be properly positioned to provide flow restriction repeatability.

BRIEF DESCRIPTION OF THE DRAWINGS

The foregoing will be more readily apparent upon reading the following description in conjunction with the drawings in which like elements in different figures thereof are identified by the same reference numeral and wherein.

DETAILED DESCRIPTION

Figure 1:
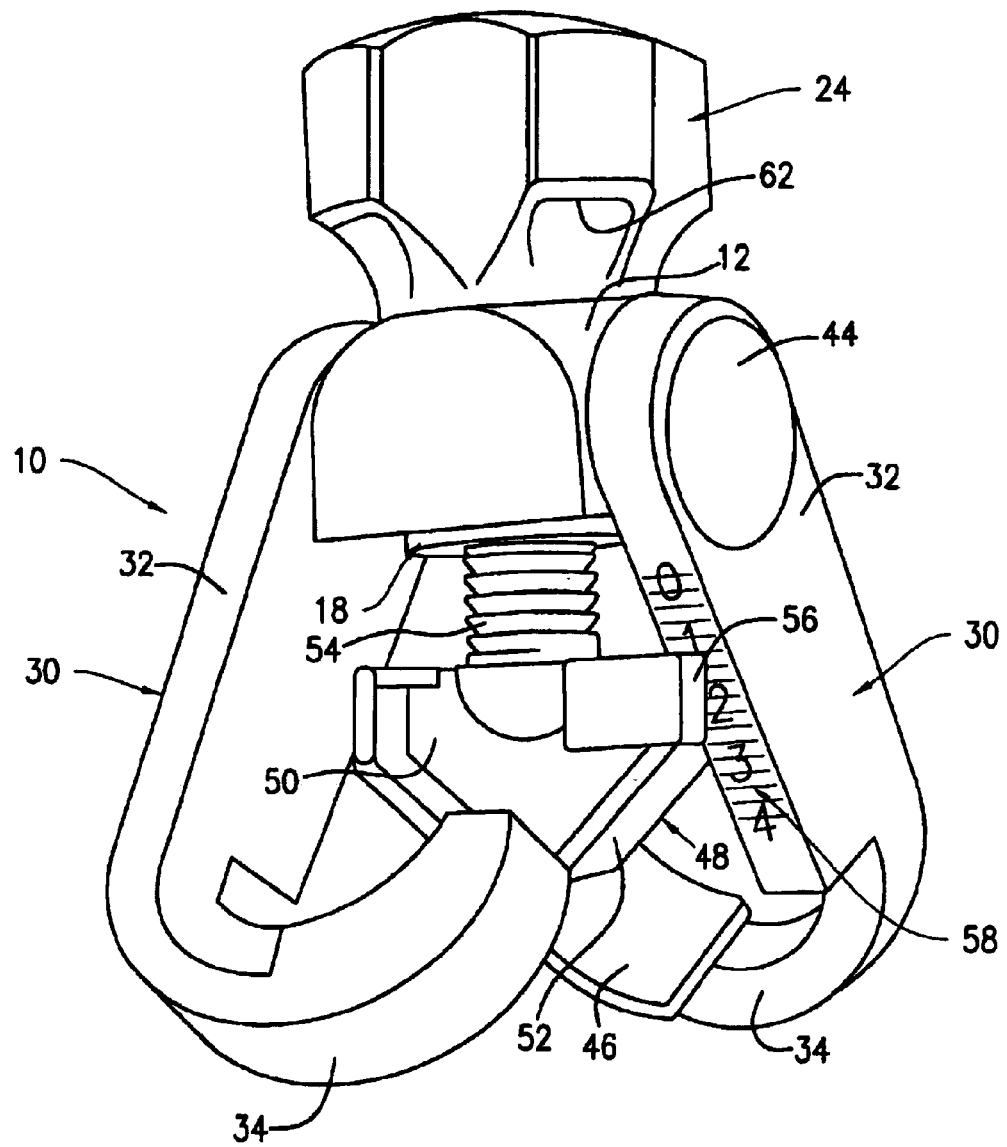
FIG. 1 is a perspective view showing the inventive flow restrictor with its leg members pivoted apart to allow the flow restrictor to be installed on a length of tubing.
Figure 2:
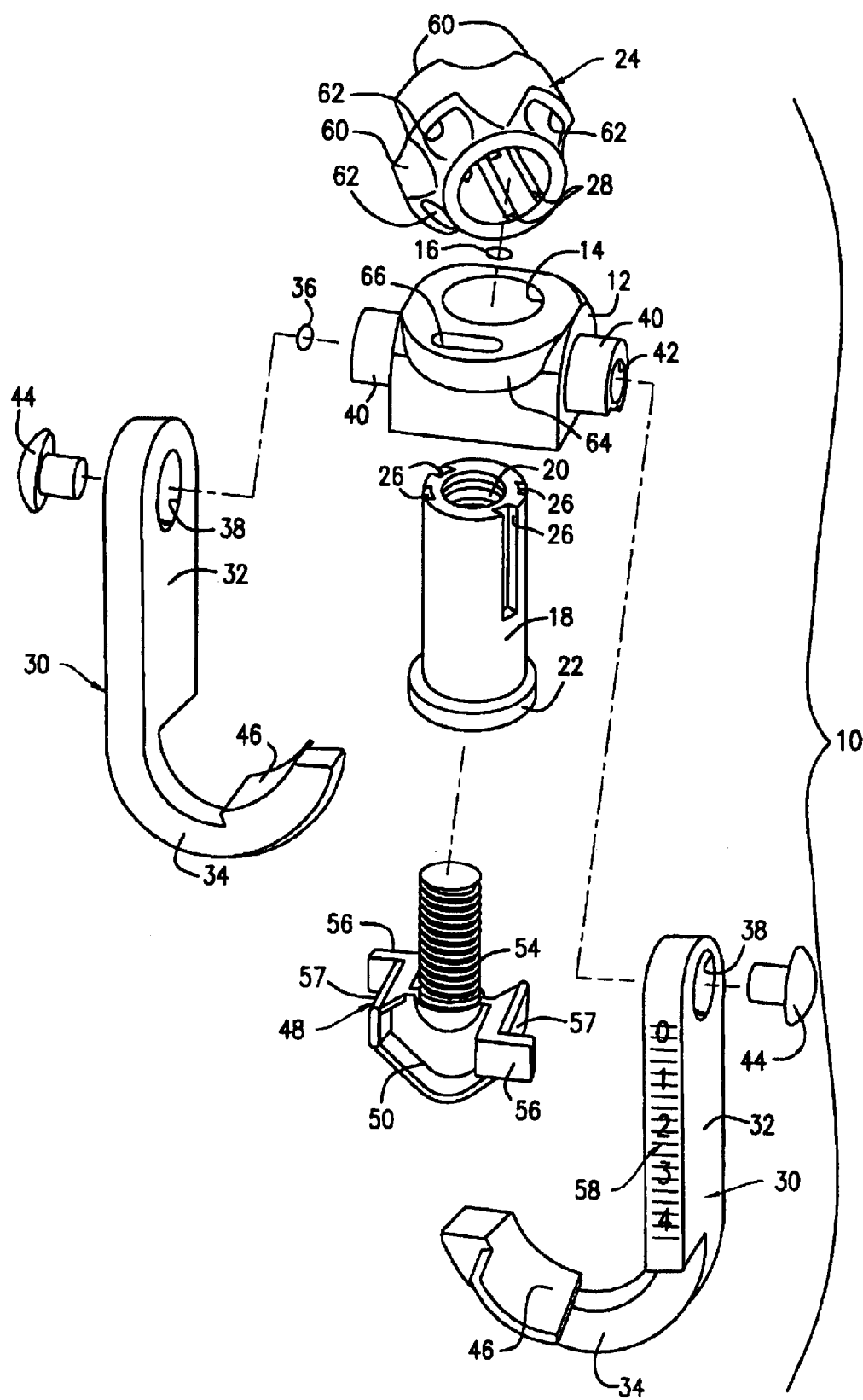
FIG. 2 is an exploded perspective view of the inventive flow restrictor.

Referring now to the drawings, there is illustrated a flow restrictor device according to the present invention and designated generally by the reference numeral 10. The device 10 includes a block 12 which is formed with a through bore 14 defining a first axis 16. A sleeve 18 having internal threads 20 is installed in the bore 14. The outer diameter of the sleeve 18 has clearance with respect to the inner diameter of the bore 14 so that the sleeve 18 is rotatable within the bore 14 about the first axis 16. The sleeve 18 extends through the bore 14 until the flange 22 abuts against the lower surface of the block 12 or a counterbore (not shown) at the lower end of the bore 14. The upper portion of the sleeve 18 extends outwardly of the bore 14 above the block 12. A knob 24 is non-rotatably secured to the sleeve 18 outside the block 12, as by keyways 26 and elongated projections 28, or alternatively by being press fit thereon.

The device 10 further includes a pair of leg members 30, preferably identical, each of which is preferably generally J-shaped with a straight portion 32 terminated by a curved portion 34. The leg members 30 are mounted at the ends of their respective straight portions 32 remote from their curved portions 34 to opposite sides of the block 12 for pivoting movement about a second axis 36 orthogonal to the first axis 16. Illustratively, the mounting ends of the straight portions 32 are formed with bores 38 which fit over collars 40 on opposite sides of the block 12. The collars 40 have central bores 42 defining the second axis 36. Headed studs 44 each extend through a respective bore 38 and are press fit into a respective bore 42. The distal ends of the curved portions 34 of the leg members 30 are formed with enlarged surfaces 46 so that when the leg members 30 are pivoted toward each other so as to have their straight portions 32 parallel to the first axis 16, the two enlarged surfaces 46 together form a tube support surface, as will be described hereinafter.

The device 10 also includes a jaw member 48 having a head 50 with a surface 52 on a first side shaped substantially complemental to the tube support surface formed by the enlarged surfaces 46 of the leg members 30. A threaded shaft 54 extends from a second side of the head 50 opposite the surface 52 and is threadedly mated with the internal threads 20 of the sleeve 18. Preferably, the threads of the shaft 54 and the sleeve 18 are of the buttress type. The head 50 of the jaw member 48 further includes a pair of opposed outwardly extending projections 56. These projections 56, along with the flat sides 57 of the head 50, engage the straight portions 32 of the leg members 30 to prevent rotation of the jaw member 48 when the sleeve 18 is rotated by the knob 24, thereby causing the jaw member 48 to travel along the first axis 16 as the knob 24 is rotated. A feature of the present invention is the provision of indicia 58 along that side of each leg member straight portion 32 which the respective projection 56 moves along. The combination of the projections 56 and the indicia 58 provides a means whereby repeatability of settings of the flow restrictor device 10 is attained.

Figure 3:
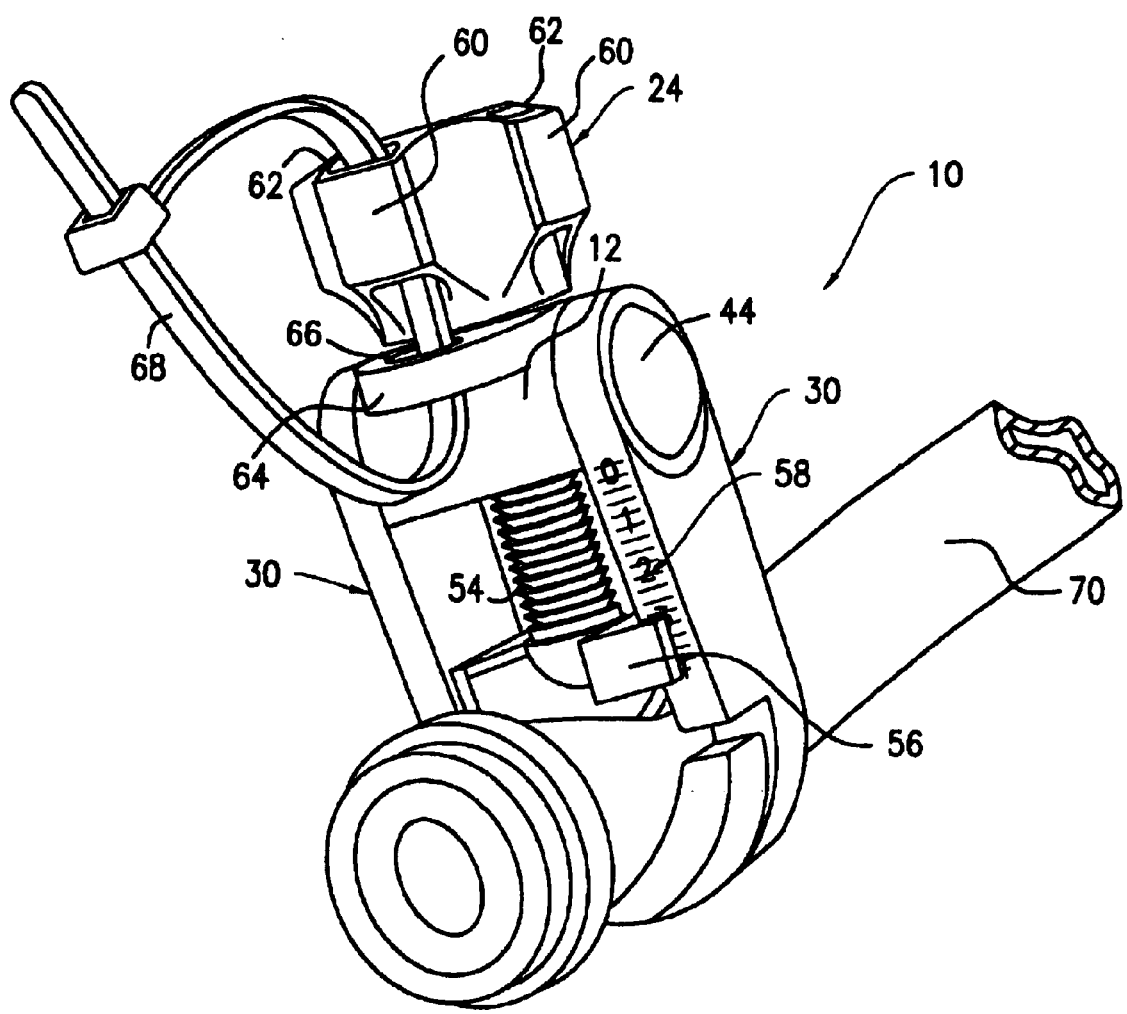
FIG. 3 is a perspective view showing the inventive flow restrictor installed on a length of resilient tubing and with a cable tie locking the flow restrictor.

As shown in the drawings, the knob 24 is formed with a plurality of projections 60 each having a respective aperture 62 along an axis parallel to the first axis 16. Correspondingly, the block 12 is formed with a projection 64 extending outwardly from the block 12 orthogonal to the first axis 16. The projection 64 has an aperture 66 therethrough along an axis which is parallel to the first axis 16. As the knob 24 is turned, each of its apertures 62 is aligned in turn with the aperture 66. As shown in FIG. 3, a cable tie 68, or other suitable element, may be inserted through the aperture 66 and the aligned one of the apertures 62 so as to provide a lock and tamper indicator for the flow restrictor device 10.

To use the flow restrictor device 10, initially the leg members 30 are pivoted away from each other, as shown in FIG. 1. The knob 24 is rotated counter-clockwise to cause the head 50 of the jaw member 48 to move upwardly toward the lower surface of the block 12. A desired length of tubing 70 is then manipulated into the space between the separated curved, portions 34 of the leg members 30 and placed over the enlarged surfaces 46. The leg members 30 are then pivoted toward each other until their curved portions 34 abut and the two enlarged surfaces 46 together form a tube support surface. The knob 24 is then rotated clockwise so that the head 50 of the jaw member 48 moves away from the block 12 and toward the tubing 70. The surface 52 of the head 50 then engages the tubing 70, and continued rotation of the knob 24 causes compression of the tubing 70 between the surface 52 and the pair of enlarged surfaces 46. Knob 24 may then be rotated until there is sufficient compression of the tubing 70 to provide the desired flow restriction through the tubing 70. In the extreme case, the knob 24 is rotated until the tubing 70 is compressed to the point where all flow through the tubing 70 is completely cut off. The buttress threads of the sleeve 18 and the shaft 54 ensure a maximum clamping force and the wide surfaces 52 and 46 ensure good surface area compression. When the desired compression of the tubing 70 is attained, the cable tie 68 may be installed to provide a lock and tamper indicating function. The position of the projections 56 vis-à-vis the indicia 58 may then be noted so that repeatability of flow restriction is attainable.

Accordingly, there has been disclosed an improved flow restrictor device. While an illustrative embodiment of the present invention has been disclosed herein, it will be appreciated by those skilled in the art that various adaptations and modifications to the disclosed embodiment are possible. It is therefore intended that this invention be limited only by the scope of the appended claims.

What is claimed is:

1. A device for controllably restricting flow through a resilient tube, the device comprising:
   a block having a bore therethrough along a first axis;
   an internally threaded sleeve rotatable within said bore abut said first axis;
   a knob outside said block fixedly secured to said sleeve for rotation therewith;
   a pair of leg members each being mounted to a respective one of a pair of opposite sides of said block for pivoting movement about a second axis orthogonal to said first axis, said pair of leg members when pivoted toward each other together forming a tube support surface; and
   a jaw member having a head with a surface on a first side shaped substantially complemental to the tube support surface formed by the pair of leg members and a threaded shaft extending from a second side opposite said first side and threadedly mated with said sleeve.

2. The device according to claim 1 wherein:
   each of said pair of leg members is generally J-shaped with a straight portion terminated by a curved portion;
   each of said pair of leg members is mounted to said block at the end of its respective straight portion remote from its curved portion; and
   said tube support surface is formed from the curved portions of said pair of leg members.

3. The device according to claim 1, wherein:
   said block includes a projection having an aperture; and
   said knob includes at least one projection having an aperture alignable with said block projection aperture;
   whereby when said block projection and knob projection apertures are aligned, a cable tie can be inserted through both apertures to function as a lock and a tamper indicator.

4. The device according to claim 2 wherein said jaw member includes a pair of opposed projections each moving along a respective side of a respective leg member straight portion as said jaw member moves along said first axis.

5. The device according to claim 4 wherein said respective sides of said leg member straight portions are provided with indicia.

6. The device according to claim 1, wherein the threads of the sleeve and the jaw member shaft are of the buttress type.

* * * * *